(12) United States Patent
Tang et al.

(10) Patent No.: US 11,022,957 B2
(45) Date of Patent: Jun. 1, 2021

(54) SYSTEM AND METHOD FOR ADAPTIVE DOMAIN REDUCTION FOR THERMO-STRUCTURAL SIMULATION OF ADDITIVE MANUFACTURING PROCESS

(71) Applicant: Siemens Industry Software Inc., Plano, TX (US)

(72) Inventors: Tsz Ling Elaine Tang, Plainsboro, NJ (US); Lucia Mirabella, Plainsboro, NJ (US); Louis Komzsik, Huntington Beach, CA (US); Livio Dalloro, Plainsboro, NJ (US); David Madeley, Louth (GB)

(73) Assignee: Siemens Industry Software Inc., Plano, TX (US)

( * ) Notice: Subject to any disclaimer, the term of this patent is extended or adjusted under 35 U.S.C. 154(b) by 131 days.

(21) Appl. No.: 16/471,353

(22) PCT Filed: Jan. 26, 2017

(86) PCT No.: PCT/US2017/015076
§ 371 (c)(1),
(2) Date: Jun. 19, 2019

(87) PCT Pub. No.: WO2018/140019
PCT Pub. Date: Aug. 2, 2018

(65) Prior Publication Data
US 2021/0103268 A1   Apr. 8, 2021

(51) Int. Cl.
*G05B 19/4099* (2006.01)
*G06F 30/20* (2020.01)

(52) U.S. Cl.
CPC .......... *G05B 19/4099* (2013.01); *G06F 30/20* (2020.01); *G05B 2219/36199* (2013.01); *G05B 2219/49007* (2013.01)

(58) Field of Classification Search
CPC ...... G05B 19/4099; G05B 2219/49007; G05B 2219/36199; G06F 30/20
See application file for complete search history.

(56) References Cited

U.S. PATENT DOCUMENTS

| | | | |
|---|---|---|---|
| 2014/0039659 A1* | 2/2014 | Boyer | B33Y 50/00 700/98 |
| 2014/0277669 A1* | 9/2014 | Nardi | G06F 30/20 700/103 |

(Continued)

*Primary Examiner* — Ramesh B Patel (57) ABSTRACT

A system and method are provided for adaptive domain reduction for thermo-structural simulation of an additive manufacturing process. The system may include a processor configured to carry out a simulation of a part being additively produced according to a set of tool paths. The simulation may include determining an original mesh of the part; determining an order of the elements of the original mesh to deposit; and simulating an incremental deposit of each of the elements of the original mesh for a material in the order that the elements are determined to be deposited. For each incremental deposit of an additional respective element the processor may determine thermal characteristics and structural deformation characteristics of the deposited elements. After the deposit of several layers have been simulated, subsequent simulation of elements may be carried out based on a respective modified version of the original mesh in which at least some of the layers of the original mesh previously simulated to be deposited under a current layer are retained and at least some are omitted.

20 Claims, 4 Drawing Sheets

(56) References Cited

U.S. PATENT DOCUMENTS

| | | | | |
|---|---|---|---|---|
| 2017/0083003 | A1* | 3/2017 | Arisoy | G06F 30/00 |
| 2017/0372480 | A1* | 12/2017 | Anand | G06T 19/20 |
| 2018/0095450 | A1* | 4/2018 | Lappas | B22F 10/00 |
| 2018/0268091 | A1* | 9/2018 | Arisoy | B33Y 50/00 |
| 2018/0314235 | A1* | 11/2018 | Mirabella | G06F 30/23 |
| 2019/0188346 | A1* | 6/2019 | Mirabella | G06F 30/23 |
| 2020/0004225 | A1* | 1/2020 | Buller | B29C 64/393 |

\* cited by examiner

SYSTEM AND METHOD FOR ADAPTIVE DOMAIN REDUCTION FOR THERMO-STRUCTURAL SIMULATION OF ADDITIVE MANUFACTURING PROCESS

TECHNICAL FIELD

The present disclosure is directed, in general, to computer-aided design (CAD), computer-aided manufacturing (CAM), computer-aided engineering (CAE), visualization, simulation, and manufacturing systems, product data management (PDM) systems, product lifecycle management (PLM) systems, and similar systems, that are used to create, use, and manage data for products and other items (collectively referred to herein as product systems).

BACKGROUND

Product systems may be used to simulate structures and processes. Such systems may benefit from improvements.

SUMMARY

Variously disclosed embodiments include data processing systems and methods that may be used to facilitate adaptive domain reduction for thermo-structural simulation of an additive manufacturing process. In one example, a system may comprise at least one processor configured to carry out a simulation of a part being additively produced according to a set of tool paths that correspond to instructions usable to drive a three dimensional (3D) printer to move a laser to additively produce the part. The at least one processor may determine an original mesh of the part that partitions the space of the part into a plurality of 3D elements. The processor may also determine an order of the elements of the original mesh to deposit in a plurality of successively deposited layers for additively producing the part based on the set of tool paths. Further the at least one processor may also simulate an incremental deposit of each of the elements of the original mesh for a material in the order that the elements are determined to be deposited. For each incremental deposit of an additional respective element the at least one processor may determine thermal characteristics and structural deformation characteristics of the deposited elements. After the deposit of several layers have been simulated, subsequent simulation of elements in a current layer may be carried out based on a respective modified version of the original mesh in which at least some of the layers of the original mesh previously simulated to be deposited under a current layer are retained and at least some of the layers of the original mesh previously simulated to be deposited under the retained layers are omitted.

In another example, a method for adaptive domain reduction for thermo-structural simulation of an additive manufacturing process may comprise several acts carried out through operation of at least one processor. These acts may include carrying out a simulation of a part being additively produced according to a set of tool paths that correspond to instructions usable to drive a three dimensional (3D) printer to move a laser to additively produce the part. Such a simulation may include determining an original mesh of the part that partitions the space of the part into a plurality of 3D elements. The simulation may also include determining an order of the elements of the original mesh to deposit in a plurality of successively deposited layers for additively producing the part based on the set of tool paths. The simulation may also include simulating an incremental deposit of each of the elements of the original mesh for a material in the order that the elements are determined to be deposited. For each incremental deposit of an additional respective element the at least one processor may determine thermal characteristics and structural deformation characteristics of the deposited elements. After the deposit of several layers have been simulated, subsequent simulation of elements in a current layer may be carried out based on a respective modified version of the original mesh in which at least some of the layers of the original mesh previously simulated to be deposited under a current layer are retained and at least some of the layers of the original mesh previously simulated to be deposited under the retained layers are omitted.

A further example may include a non-transitory computer readable medium encoded with executable instructions (such as a software component on a storage device) that when executed, causes at least one processor to carry out this described method.

Another example may include a product or apparatus including at least one hardware, software, and/or firmware based processor, computer, component, controller, means, module, and/or unit configured for carrying out functionality corresponding to this described method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Various technologies that pertain to systems and methods that facilitate adaptive domain reduction for thermo-structural simulation of an additive manufacturing process will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Figure 1:
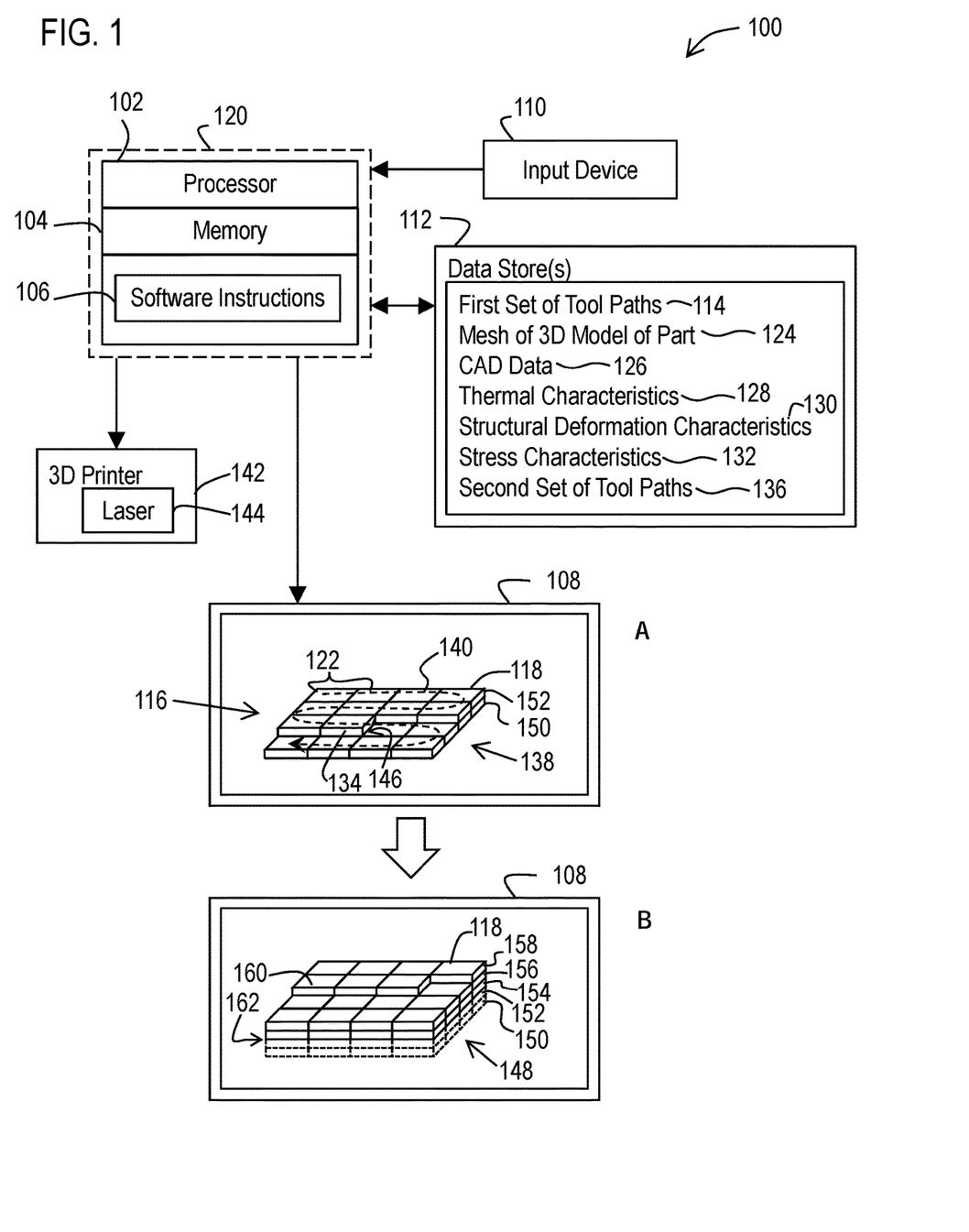
FIG. 1 illustrates a functional block diagram of an example system that facilitates adaptive domain reduction for thermo-structural simulation of an additive manufacturing process.

With reference to FIG. 1, an example data processing system 100 is illustrated that facilitates carrying out one or more of the embodiments described herein. The system 100 may include at least one processor 102 (e.g., a microprocessor/CPU) that is configured to carry out various processes and functions described herein via software instructions 106 (included in at least one application software component) that are accessed by the processor from a memory 104 and executed by the processor. Such a memory 104 may correspond to an internal or external volatile memory (e.g., main memory, CPU cache, and/or RAM), that is included in the processor and/or in operative connection with the processor. Such a memory 104 may also correspond to a nonvolatile memory (e.g., flash memory, SSD, hard drive, or other storage device or non-transitory computer readable media) in operative connection with the processor.

It should be understood that a processor that is described or claimed as being configured to carry out a particular described/claimed processes or function may correspond to the combination 120 of the processor 102 with the software instructions 106 loaded/installed into the described memory 104 (volatile and/or non-volatile), which are currently being executed and/or are available to be executed by the processor to cause the processor to carry out the described/claimed process or function. Thus a processor that is powered off or is executing other software, but has the described software instructions installed on a storage device in operative connection therewith (such as a hard drive or SSD) in a manner that is setup to be executed by the processor (when started by a user, hardware and/or other software) may also correspond to the described/claimed processor that is configured to carry out the particular processes and functions described/claimed herein. Further, it should be understood that a processor that is described or claimed as being configured to carry out a particular described/claimed process or function may correspond to a microprocessor that is hard wired (e.g., an FPGA or ASIC microprocessor) to carry out such a described/claimed process or function.

The described data processing system 100 may include at least one display device 108 and at least one input device 110 in operative connection with the processor. The display device, for example, may include an LCD display screen, monitor, and/or a projector. The input devices, for example, may include a mouse, pointer, touch screen, touch pad, drawing tablet, track ball, buttons, keypad, keyboard, camera, motion sensing device that captures motion gestures, and/or any other type of input device capable of providing the inputs described herein. For example, the processor 102, memory 104, software instructions 106, display device 108, and input device 110, may be included as part of a data processing system corresponding to a PC, workstation, server, notebook computer, tablet, mobile phone, or any other type of computing system, or any combination thereof.

In an example embodiment, the described software instructions 106 may include and/or correspond to one or more components of a PLM software application that is configured to retrieve, generate, and store product data in a data store 112 such as a database (e.g., Oracle, Microsoft SQL Server), file system, hard drive, SSD, memory card and/or any other type of device or system that stores non-volatile data.

Examples of PLM software applications that may be adapted to carry out the features and functions described herein may include computer-aided design (CAD) software, computer-aided manufacturing (CAM) software, computer-aided engineering (CAE) software, and finite element analysis components and solvers included in the NX suite of applications and Solid Edge Simulation software produced by Siemens Product Lifecycle Management Software Inc., of Plano, Tex., US. However, it should be appreciated that the systems and methods described herein may be used in other product systems (e.g., a simulation system) and/or any other type of system that generates and stores product data in a database.

Such PLM software applications may be configured to generate tool path instructions 114 (e.g., G-code or other instructions) that are usable by three-dimensions (3D) printers to produce parts based on 3D models (e.g., solid models, 3D CAD models, and/or geometric models) of the parts. It should be understood that a 3D printer corresponds to a machine capable of additively manufacturing (i.e., producing) 3D articles (i.e., a part) by depositing materials which bind together to form the physical structure of the part. Examples of additive manufacturing processes employed by 3D printers to build 3D parts using a high power laser or electron beam to selectively sinter or melt a powdered material (typically metallic) include: selective laser sintering (SLS), selective laser melting (SLM) and directed energy deposition (DED). Other types of 3D printers may apply other techniques for selectively depositing material to additively build up a part. Also, it should be understand that the phrase to "build up" does not require the material to be built up only in a vertical upward direction, but may include building up the part in a horizontal direction as well as building up the part in a vertical downward direction, depending on the technology of the 3D printer that is used.

The geometric accuracy and mechanical performance of a 3D printed part may be influenced by the raw material and process parameters that may make the final part deviate from the original design. As a part is being manufactured, the higher energy heat source of some additive manufacturing processes may introduce thermal distortion and residual stress. For example, due to the presence of thermal gradients during heating and cooling, these processes may introduce residual stress, which can cause deformations (warping) and/or cracks on the part as the part cools. The presence of these defects can hinder tolerance and affect mechanical strength. However, the location and magnitude of such deformations are not always predictable based on the shape of the part, especially for complex geometries and complex melting paths (i.e., the laser tool paths).

Example embodiments may enable modeling and simulation of additive manufacturing processes in order to predict the quality of the printed object that will be produced by the actual physical additive manufacturing process. For example, an example embodiment may correspond to a computer-aided simulation tool that uses one or more finite element analysis solvers (e.g., software modules) to evaluate the locations and amounts of warping and residual stress for arbitrary geometry produced via an additive manufacturing process.

Based on the results of one or more simulations, strategies (e.g., modified tool paths, modified process parameters, and/or modifications to the structure and/or material of the part) may be employed that reduce warping, before manufacturing the part with the 3D printer. Such modified tool paths may include modifying the locations that the laser moves to ensure underlying material has sufficiently cooled before new material is sintered or melted thereon. Also, for example, modified tool paths may be generated that cause support structures to be additively built that minimize warping at identified locations on the part and that may be readily removed after the part is complete. In addition, useful modifications to the part that are determined or identified by the application software component may include thickening of a portion of the part to compensate for undesirable warping of material identified in an initial set of tool paths. Identifying and/or automatically generating such modified tool paths or modified design of the part, may minimize defects in the part and may reduce manufacturing costs and time for performing such analysis in an experimental setting.

However, possible impedance to the wide-spread use of such simulations may be the lengthy computation time of such simulations. Increasing the time-varying computational domain with more combinations of variables may introduce additional complexity to the simulation of the 3D model of the part and significantly increase the amount of time to perform the simulations. In particular for example, computational cost may increase dramatically during the course of the simulation, as more material is being added to the computational domain of the simulation.

In one possible approach to attempt to reduce computation time, a solver may be configured to perform adaptive mesh refinement and de-refinement during the finite element simulation. During the simulation, a quadrilateral mesh of the part may be automatically refined at the heated region to ensure the heated region is solved with fine resolution. As the heat source moves farther away (in the build direction) from earlier deposited layers, the fine mesh coarsens to reduce the computational cost. This approach may reduce the computational cost of the simulation while preserving details at local regions. However, this approach may require a complicated mesh refinement algorithm at each step (e.g., each incremental addition of a quadrilateral element to the mesh) to coarsen portions of the mesh, and additional computational resource may be spent to perform the mesh refinement and de-refinement operations. Also this approach may include an ongoing data transfer between coarse and fine mesh during the simulation, which may require computational resources.

The following described example embodiments provide another approach that may be operable to reduce the computational resources required to simulate additive manufacturing processes and hence shorten the simulation time. Such examples may take advantage of characteristics of the physics regarding a 3D printing process in which the solid material comprising the first deposited layers of the part being printed has already cooled down or has very little variations over time, hence showing negligible structural deformation. Including such cooled layers in the simulation of subsequent layers can pose significant burden on the computational cost, especially for large parts, without dramatically improving the fidelity of the results.

Thus, an example embodiment of the described system and method may carry out a simulation of an additive manufacturing process, which removes layers from the mesh that have minimum impact on the result of the simulation. This approach may thus adaptively reduce the computational domain by reducing computations associated with cooled layers and mesh refinement, which reduces the overall time to complete a simulation of a part. In addition, because the layers removed from the mesh may have at least some thermal characteristics that impact the properties of layers that remain in the mesh, this described example may capture such thermal characteristics of the removed layers via boundary conditions (calculated based on the removed layers). This resulting approach may be implemented as a new solver for the thermo-structural behavior of a part being manufactured using additive manufacturing technology.

To carry out these features, the described processor 102 may be configured (via software instructions 106) to carry out a simulation of a part being additively produced according to a set of tool paths 114 that correspond to instructions (such as GCode) that are usable to drive a 3D printer 142 to additively produce the part. For example, the instructions may be usable to drive the 3D printer to move a laser 144 that produces a beam of laser light (or other type of deposition head), through a set of paths that sinters/melts powder material (or otherwise deposits material) so as to build up the part.

In some embodiments, such a simulation may be visually outputted to a user. For example, the processor may cause the display device 108 to output a graphical user interface (GUI) that includes a visual representation 116 of the simulation. Such a visual simulation may include an animation of the incremental buildup of the part 118 as the tool (e.g., a laser and/or deposition head) of the 3D-pinter moves according to the set of tool paths 114. FIG. 1 shows a schematic visual broken line representation 140 of an example portion of the set of tool paths 114 that the laser 144 will follow to build up the part 118 in order to form a block shape.

In this example, the processor may be configured to determine an original mesh 124 of the part (such as a Cartesian hexahedral mesh having vertices/nodes and their connections) that partitions the space of the part into a plurality of 3D elements (e.g., hexahedron shaped cells or zones). In other examples the determined mesh may be comprised of tetrahedrons, polyhedrons, or other 3D shapes). The visual representation 116 graphically illustrates a portion of the elements 122 of the mesh 138 that have been deposited to build up the initial (lower) portions of the part 118.

In example embodiments, the hexahedron shaped elements 122 that make up the mesh may 138 have dimensions based on configuration data for the 3D printer that is desired to produce the part. For example, the height of the hexahedron elements for the mesh may correspond to one or more thicknesses of layers of material that the 3D printer is capable of depositing. Also for example, the width of the hexahedron elements may correspond to the width of the material that the tool of the 3D printer is capable of depositing. For a 3D printer that uses a laser, such a width of the hexahedron elements may correspond to a laser beam diameter, which corresponds to the width of the powder that the laser is capable of sintering/melting as it moves along a tool path. In some embodiments, the hexahedron elements width or height may also be restricted by the geometry at the areas closer to the surface of the part.

In an example embodiment, the processor may be configured to determine an order of the elements 122 of the mesh to deposit to simulate additively producing (i.e., building up) the part 118 based on the set of tool paths 114. For example, the order of the elements deposited may be based on a determination as to which hexahedrons of the hexahedral mesh 124 intersect with an output of a tool (e.g., laser beam output) of the 3D printer as the tool follows the set of tool paths 114 in order to add material (e.g., via sintering or melting powder) to form the part.

As used herein, the term deposit or depositing refers to the generation of additional material that is deposited onto the build plate and addition portions of the part. Thus a deposition head of a DED 3D printer that both outputs and melts powder, is to be understood as carrying out a process of depositing the melted powder in a particular location. Similarly, for SLS and SLM 3D printers that both inclemently apply a layer of powder followed by selectively sintering or melting portions of the powder, depositing of material corresponds to sintering or melting powder in a particular location. In addition, it should be noted that many of the examples described herein are with respect to SLS type 3D printers. However, it should be appreciated that the described framework may be adapted for other types of additive manufacturing processes and 3D printers, by modifying the input parameters provided and the boundary conditions.

In example embodiments, the determined tool paths 114 and mesh 124 may be stored in the memory 104 and/or the data store 112 for use with the functions described herein. In addition, data regarding the shape of the part may be stored in the memory and/or data store, which is usable by the processor to determine the tool paths and the mesh.

For example, the application software component may include one or more components capable of generating the tool paths and the mesh based on 3D-model data of the part defined by CAD data 126. Such CAD data may correspond for example to a CAD file in a format such as JT or STEP for storing geometric curves that define the shape of the part. In addition, it should also be appreciated that the 3D-model data, by which the tool paths and mesh are determined, may be generated from a 3D scan of an existing physical part.

The described software instructions 106 may be included in one or more CAD/CAM/CAE components capable of generating all three of the 3D model, mesh, and tool paths. However, it should also be appreciated that one or more of the CAD data 126, mesh 124, and/or tool path instructions (e.g., GCode that define the tool paths 114) may be generated by different systems/software and saved to one or more data stores 112 that are accessible to the at least one processor 102 that carries out the described simulation.

To carry out the simulation, the processor 102 may simulate an incremental deposit of each of the elements 122 of the mesh in the order that the elements are determined to be deposited. For each incremental deposit of an additional respective element, the at least one processor may determine thermal characteristics 128 and structural deformation characteristics 130 of the deposited elements. As used herein, the term "characteristics" is to be construed broadly as data corresponding to attributes, aspects, features, and/or properties of the particular type of characteristics (e.g., thermal, structural deformation, stress) being described. For example, thermal characteristics of an element may include data corresponding to thermal behavior, thermal distributions, temperatures, and/or temperature gradients. Also, structural deformation characteristics of an element may include data corresponding to warping of the shape of the element. In addition, stress characteristic may include data corresponding to stress distribution for Von Mises stress. It should also be understood that these described determined thermal, structural deformation, and stress characteristics refer to the results or outputs of the described finite element analysis simulations rather than to material inputs to the simulations such as (E, rho, mu, alpha).

For example, the element labeled with reference numeral 134 in FIG. 1, corresponds to the most recently deposited element along the path 140. At each incremental stage in the generation of the part 118, the processor may be configured to determine new/revised thermal characteristics) (e.g., temperature gradients) for at least the mostly recently deposited elements. As each element is deposited, many of the previously deposited elements may have cooled with the passage of time. Also, some of the elements (or portions thereof) adjacent to the most recently deposited element may increase in temperature with the transfer of heat from the laser and/or the most recently deposited element. To capture a simulation of these changes over time for the temperatures of the elements (and/or portions thereof), a new/revised set of thermal characteristics may be determined with the simulated incremental deposit of each additional element.

In addition, at each incremental stage in the generation of the part 118, the processor may be configured to evaluate the structural deformation (e.g., warping) of one or more of the most recently deposited elements to determine a new/revised set of structural deformation characteristics. Such warping may be quantified in terms of the magnitude of the displacement of vertices/nodes of the hexahedron shape of each element. In example embodiments, the structural deformation characteristics may be based at least in part on the determined thermal characteristics.

For example, a newly deposited element will generally be hotter and thus larger in dimensions than the originally determined hexahedron shape of the element for the final desired shape of the part. As the element cools, the shape of the element will generally become closer to the expected shape of the element specified in the original mesh. However, in some cases the shape of the element may not shrink to the expected hexahedron shape of the mesh after it has cooled or has not completely cooled. Thus the described structural deformation characteristics may quantify how much the shape of the element deviates from its original determined shape in the mesh. To capture these changes over time to the structural deformation of the elements as the part cools, a new/revised set of structural deformation characteristics may be determined with the simulated incremental deposit of each additional element.

In order to accurately simulate the impact of such structural deformations on the structure as the part is built up over time, one or more of the respective simulated newly deposited elements may be structurally modified prior to determining the thermal and structural deformation characteristics of the respective element so as to account for a volume change to the respective element resulting from structural deformation of a certain number of adjacent elements 146 determined from previously determined structural deformation characteristics. Thus, the processor 102 may be configured to modify the described mesh (with each incremental deposit of an element) to change the volume (e.g., size/ shape) of one or more of each newly deposited element based on the determined deformations of previously deposited adjacent elements 146. Examples of the calculation of such volume changes are discussed in International patent application no. PCT/US2016/024695 filed Mar. 29, 2016 and U.S. application No. 62/247,241 filed Oct. 28, 2015, which are hereby incorporated herein by reference in their entirety.

In addition, the processor may be configured to determine stress characteristics 132 (e.g., stress distribution) across the part based on the determined thermal characteristics and/or structural deformation characteristics. Such stress characteristics may be determined after each deposit of an additional element in the simulation. Alternatively, stress characteristics may be determined after sets of elements (such as a layer) have been deposited in the simulation. Further, in alternative embodiments, stress characteristics may be determined after the simulation for the entire part is complete.

In example embodiments, the processor 102 may be configured to store data representative of the determined thermal characteristics 128, structural deformation characteristics 130, and/or stress characteristics to the data store 112. Since such data may be determined incrementally for each block, the data stored in the data store may include the corresponding determined thermal characteristics 128 and/or structural deformation characteristics 130, (and optional stress characteristics 132) for the respective shape (or portion thereof) of the part as each element is deposited for the simulation. In addition, the determined data for each incremental deposit may be associated with time data reflective of the time that the 3D printer is simulated to have deposited the most recent element (or portion thereof).

In some example embodiments, the processor may be configured (via the software instructions) to cause the display device 108 to display an animation of the simulation that highlights visually (via different colors, shading, dot density, dashed lines) the change over time in temperatures, deformation levels, and stress characteristics as each element is deposited for the simulation. The display device may further output quantitative data regarding the temperature, structural deformation, and/or stress characteristics calculated for each element at each incremental step in which an element is added to build up the part.

Referring to FIG. 1, view A of the display device 108 illustrates the incremental deposit of a first set of layers 150, 152. To reduce the computation time for the simulation, after the deposit of these layers 150, 152, subsequent simulation of elements in a current layer 158 (shown in view B of the display device 108) may be carried out based on a respective modified version 148 of the mesh of the part. In this modified mesh 148, at least some of the earlier deposited layers 154, 156 of the original 124 mesh that were previously simulated to be deposited under the current layer 158 are retained and at least some of the layers 150, 152 of the original mesh 124 previously simulated to be deposited under the retained layers 154, 156 are omitted from the modified mesh 148.

In this described example, the software instructions may be configured to determine whether to omit layers from the modified mesh 148 when new elements ($E_D$) are to be deposited in a new layer that is simulated to be printed. The processor may be configured to select the number of layers ($N_L$) below the new (current) layer ($L_c$), to be retained for the simulation of the deposit of the current layer. Also the processor may be configured to modify the boundary conditions at the interface between the retained and the omitted portions of the part, for both the structural and the thermal simulations to be performed for the new elements in the currently layer. The processor may be then be configured to perform the thermal and structural simulations of the current layer ($L_c$) and the top ($N_L$) layers before it.

As discussed previously, the thermal and structural data produced via the incremental simulation of the deposit of each element over time may be stored in the data store 112. Thus, anytime when the results on the complete part/layer/element are needed (for evaluations, visualizations, or further simulations), the latest information computed for each layer/element can be queried and utilized.

Figure 2:
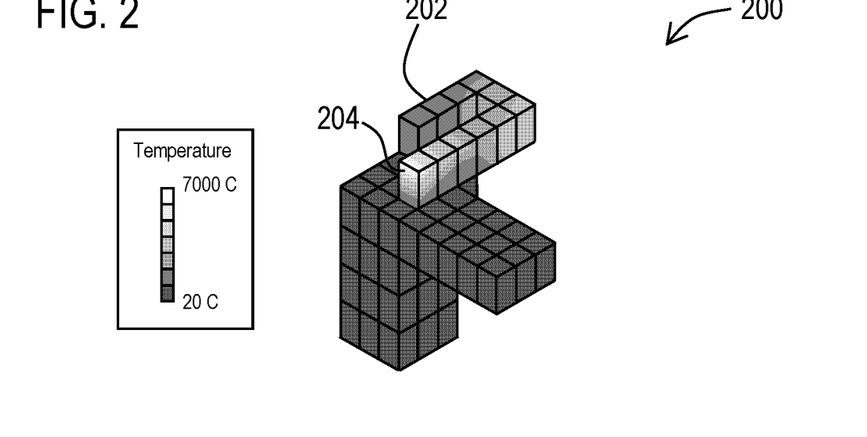
FIG. 2 illustrates an example visual representation of a mesh of a partially printed part showing a thermal gradient across the elements of the mesh.
Figure 3:
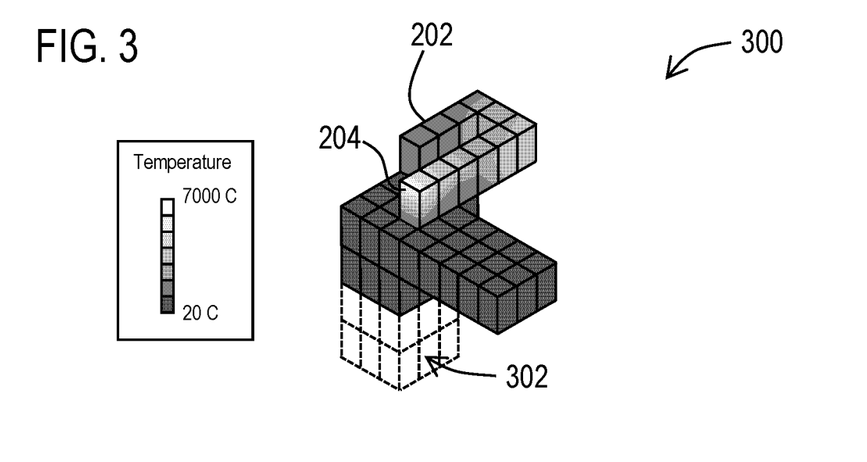
FIG. 3 illustrates an example visual representation of a mesh of the part in which two bottom layers are shown omitted (via phantom lines) from the mesh used in the simulation for the elements currently being deposited.

FIG. 2 illustrates an example visual representation 200 of a mesh for a partially printed part that is producible from such stored data in the data store 112, which shows the calculated thermal gradient across the elements of the mesh immediately after the most recent element 204 has been deposited. FIG. 3 shows an example visual representation 300 of a modified mesh for this partially printed part 202 in which two bottom layers 302 are shown omitted (shown in phantom via broken lines) where the value of the $N_L$=2. In these examples, the lighter shading of the elements represents relatively higher temperatures of the deposited material compared to the more darkly shaded elements. For example, the white shading on element 204 may correspond to a temperature range approaching 7000 C, whereas the darkest shaded elements may have portions that are less than 200 C.

Figure 4:
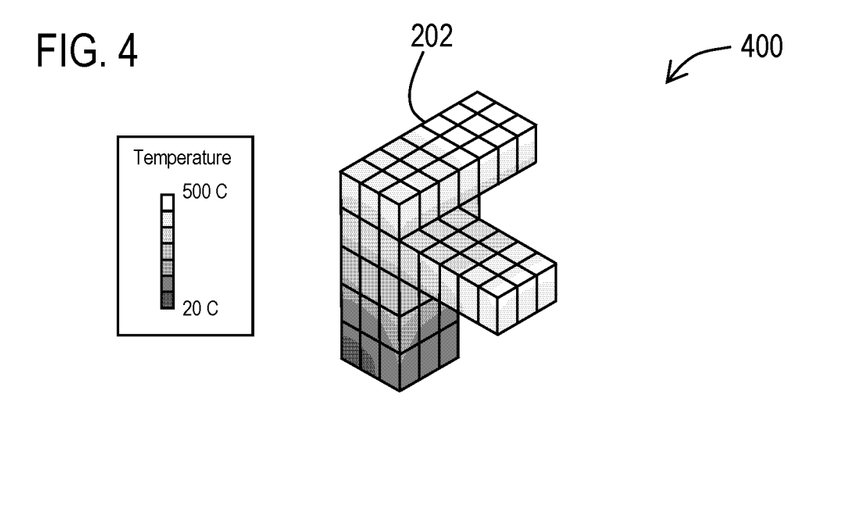
FIG. 4 illustrates an example visual representation of the mesh for the completed part after completion of the simulation showing a thermal gradient after a cool down period of time.

After the simulation of the printing process has completed, the described software instructions may be configured to carry out simulation of the cool down of the complete part, and compute the resulting structural deformation and stress levels on the complete part (i.e., with no layers omitted) based on the initial conditions associated with the simulation. FIG. 4 illustrates an example visual representation 400 of the mesh for the complete part 202 after completion of the simulation based on the data stored in the data store 112, showing a thermal gradient after a cool down period of time.

One approach to select the active layers to be retained in the simulation may be based on the change of rate of the consecutive layers' thermal gradients. For such a gradient-based selection, the described processor may be configured to compute the thermal gradient for each layer. For example, for each layer already completed, the processor may be configured to compute a representative value of the gradient $f(\nabla T)$, such as the $L^2$ norm over the layer and may compute the number of layers $N_{L=}$, with $f(\nabla T)$ larger than a chosen threshold below the current printing point (on layer $L_c$), to be retained in the next simulations. Thus, one option is to consider the actual value of the gradient norm in order to determine the layers to retain/omit. However, other options are to consider the time derivative of the temperature or of the gradient (rate of change in time), or the difference between gradient norm in one layer and gradient norm in the consecutive one (e.g., f( ) may be a function involving time and space derivatives of the temperature field).

Another approach to select the active layers to be retained in the simulation may be based on an examination of past simulation results for similar geometries (i.e., past experience). In this example, the software instructions may be configured to select the number of layers $N_E$ to retain in the simulation based on past experience and may set the number of layers $N_L$ to the minimum value between the current layer $L_c$ and the determined number of layers $N_E$ to retain.

Referring to FIG. 1, when simulating the incremental deposit of the elements 160 in the current layer 158 via a modified mesh 148 in which at least some of the layers 150, 152 of the original mesh have been omitted, the at least one processor 102 may be configured to carry out the simulation using a boundary condition for an interface 162 between the retained layers 154, 156 and the omitted layers 150, 152. Such boundary conditions to be prescribed at the interface between the retained and the omitted portions of the part may be determined to minimize the influence of the domain reduction on the simulation results in the retained portion of the part. Such an interface, in case of a building direction along the Z Cartesian axis, may be the bottom surface of the bottom-most layer to be retained (i.e., layer number $[L_c - N_L]$).

For the thermal simulation, a modified convection boundary condition for the interface 162 may be used to simulate, in a lumped parameter fashion, the presence of the omitted printed layers. In an example embodiment, such a boundary condition may be based on the thickness of the omitted layers, a convection heat transfer coefficient and thermal conductivity coefficient of the material that is used to print the part. For example, where h is the actual convection (heat transfer) coefficient, k is the conduction (thermal conductivity) coefficient, and S is the thickness of one layer, the convection coefficient to use for the boundary condition at the interface 162 may be defined as:

$$\hat{h} = \frac{h*k}{k + h*(S*(L_c - N_L))}$$

This calculated boundary condition may then be provided along with the modified mesh (with the omitted layers) to the solver that is configured to calculate the thermal and structural deformation characteristics associated with each deposit of an element to build up a part additively over time. For the structural simulation, the interface between the retained and the omitted portions of the part may be constrained to move only in a plane parallel to the building plane (except for the starting two fully constrained nodes, necessary for a well-posed structural problem).

Based on visual and/or quantitative data provided by such simulations, a user may manually modify the 3D model of the part and/or the pattern of tool paths, in order to produce a second (i.e., different) set of tool paths that achieves less warping and/or stress characteristics in the finished part. However, it should also be appreciated that in further embodiments, software instructions 106 may automatically produce a second set of tool paths 136 and/or modify the CAD data 126 for the 3D model of the part, in order to attempt to produce the part with less warping and or stress characteristics. For such embodiments, based on at least one of the thermal characteristics 128, the structural deformation characteristics 130 and/or stress characteristics 132 determined for one or more of the elements 122, the at least one processor may be configured to at least one of select a second set of tool paths and/or generate a second set of tool paths usable to drive the 3D printer to additively produce the part in a manner different than the initial set of tool paths 114.

For example, the application software component may be operative to generate tool paths with different patterns such as a zigzag (back and forth) pattern, a spiral pattern (spiraling inwardly, or outwardly), and/or any other pattern, to build up each layer of a part. The visual representation 116 in FIG. 1 illustrates tool paths 140 that correspond to a zigzag pattern. However, if such a pattern produces unacceptable thermal, structure deformation and/or stress characteristics, the application software component may be operative to select a different tool path scheme such as a spiral pattern to build up the part.

In some examples, software instructions may be configured to carry out the simulations described herein for several of these different patterns in order to identify and select which set of tool paths produces optimal thermal, structural, and/or stress characteristics (relative to the other sets of tool paths tested; and/or relative to predetermined thresholds regarding thermal characteristics, structural characteristics, and/or stress characteristics). The determined optimal tool path, may then be stored in the data store and be subsequently accessed and used to instruct a 3D printer to build a physical part. For example, the selected optimal tool path may be associated with a status and/or be saved in the data store, in a manner which indicates that it is usable to generate the part, whereas non-optimal tool paths may be deleted from the data store, and/or associated with a status indicative of their lower desirability relative to the selected tool path.

It should also be appreciated that the processor may be configured to automatically alter selective portions of the set of tool paths and/or the 3D model itself in order to produce the second set of tool paths that produces quantifiably better simulation results. Such selected portions may be determined from the particular elements in the simulation results that are associated with structural deformations and stress characteristics that are above predetermined thresholds.

Such changes may include changing an order in which portions of the elements are deposited. Such changes may also include adding additional structural supports to the 3D model of the part to stiffen portions of the part experiencing deformation. Such structural supports may include an internal rib or strut that remains a permanent member of the part. However, such structural supports may include a temporary external structural support that minimizes the structural deformation as the part is being produced, and which is intended to be cut away from the part after it is completed.

In another example, the processor may be configured to determine from the simulation results that the thermal characteristics determined for at least one element has not sufficiently cooled (below a predetermined temperature threshold) via the time that the 3-D printer is determined to deposit at least one element adjacent thereto. Example embodiments may also be configured to identify from the simulation results when structural deformations and/or stress characteristics for a cooled part are above predetermined thresholds for one or more elements and/or the part as a whole.

To produce a part that avoids these issues, in some examples the processor may be configured to use a different tool path scheme (compared to what was used to generate the initial set of tool paths) in order to attempt to generate the second set of tool paths which produces quantitatively better simulation results for structural displacements and/or lower Von Mises stress.

For example, a second set of tool paths may be generated in which when a simulation is carried out, all of the elements sufficiently cool by the time a subsequent element is determined to be deposited adjacent thereto. In another example, the second set of tool paths may be generated in which when a simulation is carried out, the structural deformations and/or stress characteristics are lower than predetermined thresholds and/or are relatively lower than those determined for the initial set of tool paths.

These described simulations may be carried out based on several different inputs that are provided by the user via the input device 110 (via a GUI) and/or determined from the data store 112 or other source of parameters. Such inputs that may be used to perform the described simulations may include the previously described tool path instructions (e.g., "go to" instructions) and the type of motion of the laser (linear, curved), which are used to compute the interpolated tool path and identify the elements to be deposited at each step of the simulation. In addition, such inputs may include the previously described 3D model of the solid body geometry of the part, which is used to generate a bounding box of the part to be manufactured. Also, as described previously, example embodiments may determine the tool paths positions and type of motion based on the 3D model of the part.

In addition, such inputs may include 3D printer parameters such as a laser beam diameters/width, which is used to set the element dimension in the plane orthogonal to the build orientation, as well as the layer thickness which is used to set the element dimension in the build orientation direction. Based on these inputs which provide dimension for the described elements, and based on the bounding box determined from the 3D model of the part, the previously described hexahedral mesh may be determined.

Additional 3D printer parameters that serve as inputs for the described simulation may include feed rate and laser power. The laser beam width and the feed rate inputs may be used to compute the time spent by the laser on a top surface of a given element. The computed surface time and the laser power input may then be used to compute the heat flux to be applied on top of a given element, by dividing the power by the surface of application. Since some simulations may not automatically account for the latent heat needed by the material for phase changes, the heat flux may be calculated based on the net heat after the phase change has occurred.

Inputs may also include environmental (ambient) temperature and the actual convection coefficient of the material, which may be used to determine the convection boundary conditions, such as at the interface with the omitted layers described previously. Further, the inputs may include the base plate temperature to which the bottom of the simulated part is initialized to in order to the start the thermal simulation. In addition, inputs may include material properties which impact the thermal and structural simulations such as material properties of the printing material and powder bed properties (e.g. powder bed dimension, powder thermal conductivity) for powder bed processes.

Figure 5:
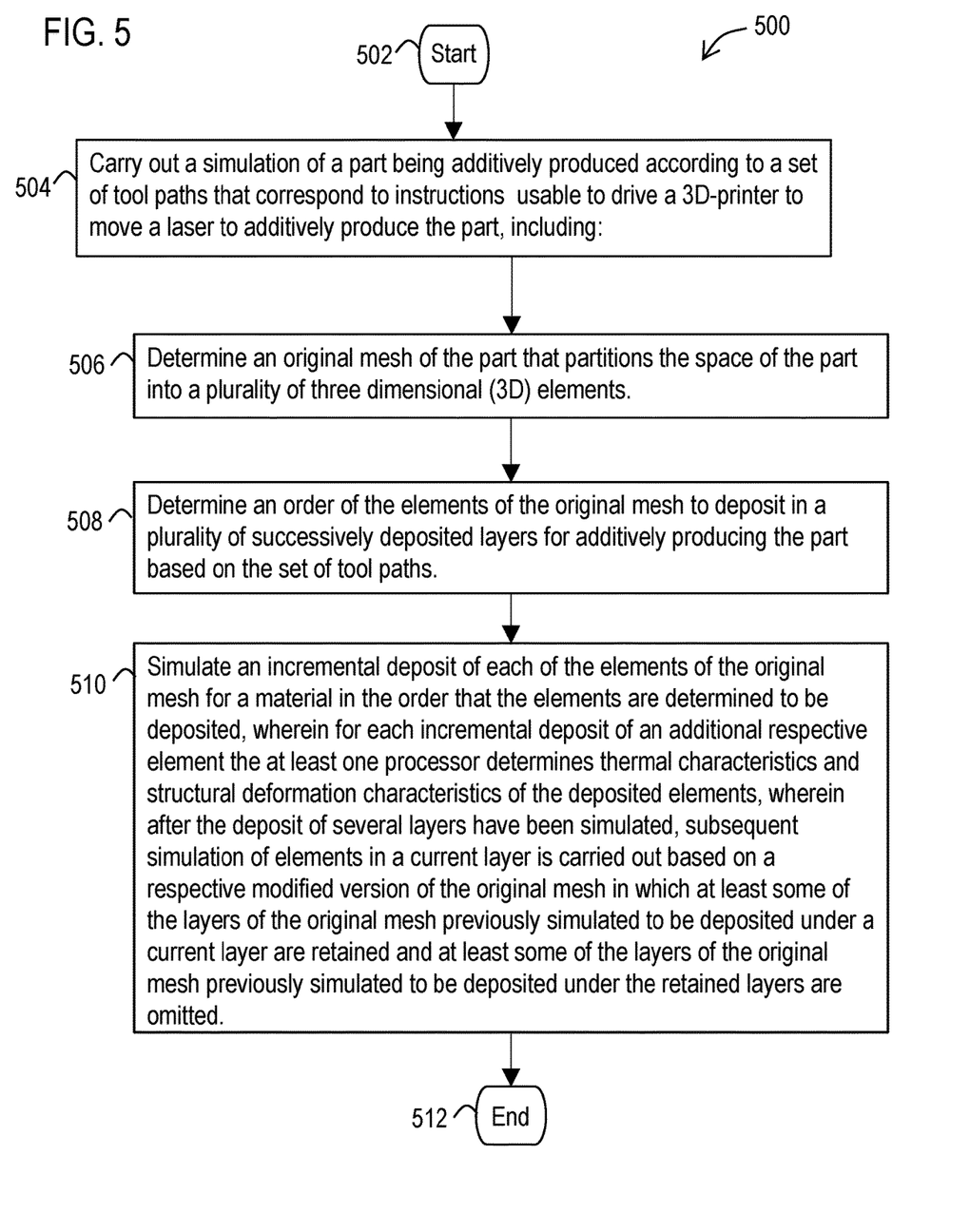
FIG. 5 illustrates a flow diagram of an example methodology that facilitates adaptive domain reduction for thermo-structural simulation of an additive manufacturing process.

With reference now to FIG. 5, various example methodologies are illustrated and described. While the methodologies are described as being a series of acts that are performed in a sequence, it is to be understood that the methodologies may not be limited by the order of the sequence. For instance, some acts may occur in a different order than what is described herein. In addition, an act may occur concurrently with another act. Furthermore, in some instances, not all acts may be required to implement a methodology described herein.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, hard disk drives, SSDs, flash memory, CDs, DVDs, and Blu-ray disks. The computer-executable instructions may include a routine, a sub-routine, programs, applications, modules, libraries, and/or the like. Still further, results of acts of the methodologies may be stored in a computer-readable medium, displayed on a display device, and/or the like.

Referring now to FIG. 5, a methodology 500 is illustrated that facilitates adaptive domain reduction for thermo-structural simulation of an additive manufacturing process. The methodology may start at 502 and may include several acts carried out through operation of at least one processor. These acts may include an act 504 of carrying out a simulation of a part being additively produced according to a set of tool paths that correspond to instructions usable to drive a 3D printer to move a laser to additively produce the part. Such a simulation may include an act 506 of determining an original mesh of the part that partitions the space of the part into a plurality of 3D elements. Also such a simulation may include an act 508 of determining an order of the elements of the original mesh to deposit in a plurality of successively deposited layers for additively producing the part based on the set of tool paths. In addition, the simulation may include an act 510 of simulating an incremental deposit of each of the elements of the original mesh for a material in the order that the elements are determined to be deposited. For each incremental deposit of an additional respective element the at least one processor determines thermal characteristics and structural deformation characteristics of the deposited elements. After the deposit of several layers have been simulated, subsequent simulation of elements in a current layer is carried out based on a respective modified version of the original mesh in which at least some of the layers of the original mesh previously simulated to be deposited under a current layer are retained and at least some of the layers of the original mesh previously simulated to be deposited under the retained layers are omitted. At 512 the methodology may end.

Also, it should be appreciated that this described methodology may include additional acts and/or alternative acts corresponding to the features described previously with respect to the data processing system 100.

For example, the act 510 may be carried out using a boundary condition for an interface between the retained and omitted layers based on the thickness of the omitted layers, a convection heat transfer coefficient and thermal conductivity coefficient of the material. Also for example the act 510 may include an act of determining simulated layers to retain for the modified mesh by computing a thermal gradient associated with each of the simulated layers and selecting simulated layers to retain for the modified mesh that are associated with a thermal gradient larger than a predetermined threshold.

In an example of the methodology, the original mesh may correspond to a hexahedral mesh comprised of the elements that are hexahedrons. The methodology may also include acts of: determining element dimensions based on data corresponding to a laser width and a layer thickness for the 3D printer; and receiving computer-aided design (CAD) data defining a 3D model of the part. The act 506 may include determining the original mesh based on the determined element dimensions and the 3D model of the part. The act 508 may include determining the order that the elements are deposited based on a determination as to which elements of the original mesh intersect with a laser beam of the laser of the 3D printer as the 3D printer operates to deposit material onto the part based on the set of tool paths.

In example embodiments of the methodology, the determined thermal characteristics include data that specifies temperature changes of deposited elements. Also the determined structural deformation characteristics include data that specifies structural changes of deposited elements determined based at least in part on the data that specifies temperature changes of the deposited elements. In addition the methodology may further comprise an act of determining stress characteristics associated with all or a portion of the part based at least in part on at least one of the thermal characteristics, the structural deformation characteristics, or a combination thereof.

In further example embodiments, the methodology may include causing a display device to output a visual animation that depicts each element being sequentially deposited to build up the part. The animation may include at least a portion of the elements visually changing with each respective deposit of an element based on the thermal characteristics or the structural deformation characteristics determined for each respective deposit of an element.

In addition, the example methodology may include generating instructions corresponding to the set of tool paths that are usable to drive the operation of the 3D printer to additively manufacture the part. Further, the methodology may comprise through operation of the 3D printer, producing the part using a configuration of the 3D printer based on the instructions corresponding the set of tool paths or the second set of tool paths.

As discussed previously, acts associated with these methodologies (other than any described manual acts) may be carried out by one or more processors. Such processor(s) may be included in one or more data processing systems, for example, that execute software components (including software instructions) operative to cause these acts to be carried out by the one or more processors. In an example embodiment, such software components may comprise computer-executable instructions corresponding to a routine, a sub-routine, programs, applications, modules, libraries, a thread of execution, and/or the like. Further, it should be appreciated that software components may be written in and/or produced by software code/environments/languages/compilers/frameworks such as with respect to machine code, assembly language, Java, JavaScript, Python, C, C#, C++ or any other software tool capable of producing software components and user interfaces configured to carry out the acts and features described herein.

Figure 6:
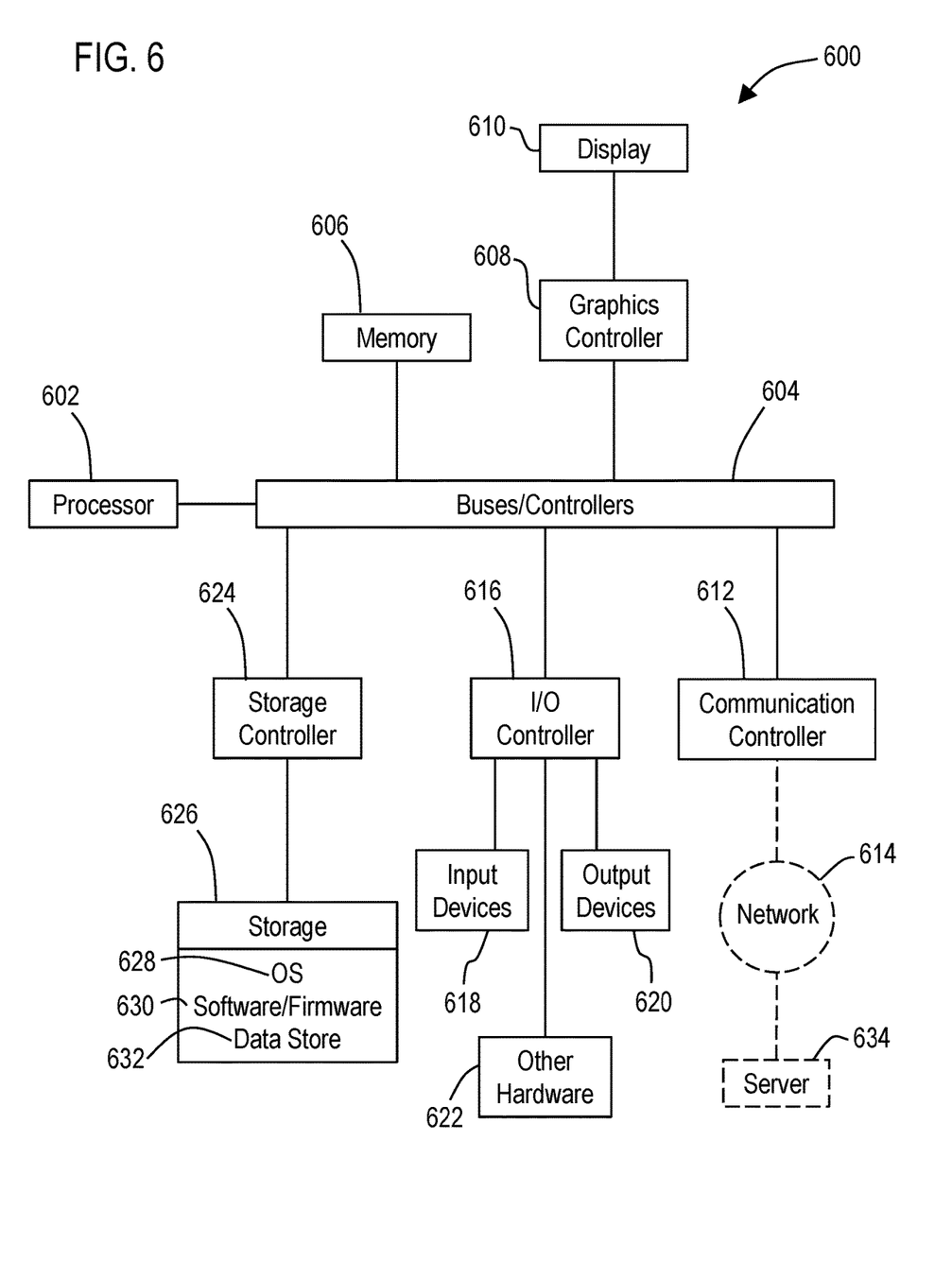
FIG. 6 illustrates a block diagram of a data processing system in which an embodiment may be implemented.

FIG. 6 illustrates a block diagram of a data processing system 600 (e.g., a computer system) in which an embodiment can be implemented, for example, as a portion of a product system, and/or other system operatively configured by software or otherwise to perform the functions and processes as described herein. The data processing system depicted includes at least one processor 602 (e.g., a CPU) that may be connected to one or more bridges/controllers/buses 604 (e.g., a north bridge, a south bridge). One of the buses 604, for example, may include one or more I/O buses such as a PCI Express bus. Also connected to various buses in the depicted example may include a main memory 606 (RANI) and a graphics controller 608. The graphics controller 608 may be connected to one or more display devices 610. It should also be noted that the processor 602 may include a CPU cache memory. Further, in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 612 (Ethernet controllers, WiFi controllers, cellular controllers) operative to connect to a local area network (LAN), Wide Area Network (WAN), a cellular network, and/or other wired or wireless networks 614 or communication equipment.

Further components connected to various busses may include one or more I/O controllers 616 such as USB controllers, Bluetooth controllers, and/or dedicated audio controllers (connected to speakers and/or microphones). It should also be appreciated that various peripherals may be connected to the I/O controller(s) (via various ports and connections) including input devices 618 (e.g., keyboard, mouse, pointer, touch screen, touch pad, drawing tablet, trackball, buttons, keypad, game controller, gamepad, camera, microphone, scanners, motion sensing devices that capture motion gestures), output devices 620 (e.g., printers, speakers) or any other type of device that is operative to provide inputs to or receive outputs from the data processing system.

Also, it should be appreciated that many devices referred to as input devices or output devices may both provide inputs and receive outputs of communications with the data processing system. For example, the processor 602 may be integrated into a housing (such as a tablet) that includes a touch screen that serves as both an input and display device. Further, it should be appreciated that some input devices (such as a laptop) may include a plurality of different types of input devices (e.g., touch screen, touch pad, and keyboard). Also, it should be appreciated that other peripheral hardware 622 connected to the I/O controllers 616 may include any type of device, machine, or component that is configured to communicate with a data processing system.

Additional components connected to various busses may include one or more storage controllers 624 (e.g., SATA). A storage controller may be connected to a storage device 626 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 604 such as a PCI Express bus.

A data processing system in accordance with an embodiment of the present disclosure may include an operating system 628, software/firmware 630, and data stores 632 (that may be stored on a storage device 626 and/or the memory 606). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 612 may be connected to the network 614 (which may or may not be a part of a data processing system 600), which can be any local, wide area, remote, private, and/or public data processing system network or combination of networks, as known to those of skill in the art, including the Internet. Data processing system 600 can communicate over the network 614 with one or more other data processing systems such as a server 634 (which may in combination correspond to a larger data processing system). For example, a larger data processing system may correspond to a plurality of smaller data processing systems implemented as part of a distributed system in which processors associated with several smaller data processing systems may be in communication by way of one or more network connections and may collectively perform tasks described as being performed by a single larger data processing system. Thus, it is to be understood that when referring to a data processing system, such a system may be implemented across several data processing systems organized in a distributed system in communication with each other via a network.

It should also be understood that the term "controller" means any device, system or part thereof that controls at least one operation, whether such a device is implemented in hardware, firmware, software or any combination thereof. It should be noted that the functionality associated with any particular controller may be centralized or distributed, whether locally or remotely. The described processor and memory may be included in a controller. Further, a controller may correspond to the described data processing system or any other hardware circuit that is operative to control at least one operation.

In addition, it should be appreciated that data processing systems may include virtual machines in a virtual machine architecture or cloud environment. For example, the processor 602 and associated components may correspond to the combination of one or more virtual machine processors of a virtual machine operating in one or more physical processors of a physical data processing system. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 600 in this example may correspond to a controller, computer, workstation, server, PC, notebook computer, tablet, mobile phone, and/or any other type of apparatus/system that is operative to process data and carry out functionality and features described herein associated with the operation of a data processing system, computer, processor, software components, and/or a controller discussed herein. The depicted example is provided for the purpose of explanation only and is not meant to imply architectural limitations with respect to the present disclosure.

Also, it should be noted that the processor described herein may correspond to a remote processor located in a data processing system such as a server that is remote from the display and input devices described herein. In such an example, the described display device and input device may be included in a client data processing system (which may have its own processor) that communicates with the server (which includes the remote processor) through a wired or wireless network (which may include the Internet). In some embodiments, such a client data processing system, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In another example, such a client data processing system may execute a web browser or thin client application. Inputs from the user may be transmitted from the web browser or thin client application to be evaluated on the server, rendered by the server, and an image (or series of images) sent back to the client data processing system to be displayed by the web browser or thin client application. Also in some examples, the remote processor described herein may correspond to a combination of a virtual processor of a virtual machine executing in a physical processor of the server.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device. Further the phrase "at least one" before an element (e.g., a processor) that is configured to carry out more than one function/process may correspond to one or more elements (e.g., processors) that each carry out the functions/processes and may also correspond to two or more of the elements (e.g., processors) that respectively carry out different ones of the one or more different functions/processes.

Also, at least one processor that is "configured to" carry out one or more functions or processes is defined herein as the combination of the at least one processor and the particular software/firmware instructions and/or wired circuits that when executed/operated by the at least one processor cause the at least one processor to carry out the one or more functions or processes described or recited herein. For example, a processor that is configured to carry out a particular function/process may correspond to the combination of the processor and the software/firmware instructions in which the processor is actively executing at least portions of the software/firmware instructions that are loaded into a volatile memory (e.g., RAM, CPU cache) and that are programmed to cause the processor to carry out the described or recited function/process. In addition, a processor that is configured to carry out a particular function/process may correspond to the combination of the processor and the software/firmware instructions in which the software/firmware instructions are stored in a non-volatile memory (e.g., flash memory, SSD, hard drive, or other storage device) in operative connection with the processor such that the software/firmware instructions are available to be accessed and executed by the processor to carry out the described function/process (even though none, or only portions of the software/firmware instructions are currently being executed by the processor).

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system 600 may conform to any of the various current implementations and practices known in the art.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A system for adaptive domain reduction for thermo-structural simulation of an additive manufacturing process comprising:
at least one processor configured to carry out a simulation of a part being additively produced according to a set of tool paths that correspond to instructions usable to drive a three dimensional (3D) printer to move a laser to additively produce the part, in which the at least one processor is configured to:
determine an original mesh of the part that partitions the space of the part into a plurality of 3D elements;
determine an order of the elements of the original mesh to deposit in a plurality of successively deposited layers for additively producing the part based on the set of tool paths; and
simulate an incremental deposit of each of the elements of the original mesh for a material in the order that the elements are determined to be deposited, wherein for each incremental deposit of an additional respective element the at least one processor determines thermal characteristics and structural deformation characteristics of the deposited elements, wherein after the deposit of several layers have been simulated, subsequent simulation of elements in a current layer is carried out based on a respective modified version of the original mesh in which at least some of the layers of the original mesh previously simulated to be deposited under a current layer are retained and at least some of the layers of the original mesh previously simulated to be deposited under the retained layers are omitted.

2. The system according to claim 1, wherein when simulating the incremental deposit of the elements in the current layer via a modified mesh in which at least some of the layers of the original mesh have been omitted, the at least one processor is configured to carry out the simulation using a boundary condition for an interface between the retained and omitted layers based on the thickness of the omitted layers, a convection heat transfer coefficient, and thermal conductivity coefficient of the material.

3. The system according to claim 1, wherein the at least one processor is configured to determine simulated layers to retain for the modified mesh by computing a thermal gradient associated with each of the simulated layers and selecting simulated layers to retain for the modified mesh that are associated with a thermal gradient larger than a predetermined threshold.

4. The system according to claim 1, wherein the original mesh corresponds to a hexahedral mesh comprised of the elements that are hexahedrons, wherein the at least one processor is configured to determine element dimensions based on data corresponding to a laser width and a layer thickness for the 3D printer, wherein the at least one processor is configured to receive computer-aided design (CAD) data defining a 3D model of the part, wherein the at least one processor is configured to determine the original mesh based on the determined element dimensions and the 3D model of the part, wherein the at least one processor is configured to determine the order that the elements are deposited based on a determination as to which elements of the original mesh intersect with a laser beam of the laser of the 3D printer as the 3D printer operates to deposit material onto the part based on the set of tool paths.

5. The system according to claim 1, wherein the determined thermal characteristics include data that specifies temperature changes of deposited elements, wherein the determined structural deformation characteristics include data that specifies structural changes of deposited elements determined based at least in part on the data that specifies temperature changes of the deposited elements, wherein the at least one processor is configured to determine stress characteristics associated with all or a portion of the part based at least in part on at least one of the thermal characteristics, the structural deformation characteristics, or a combination thereof.

6. The system according to claim 1, further comprising a display device, wherein the at least one processor is configured to cause the display device to output a visual animation that depicts each element being sequentially deposited to build up the part, wherein the animation includes at least a portion of the elements visually changing with each respective deposit of an element based on the thermal characteristics or the structural deformation characteristics determined for each respective deposit of an element.

7. The system according to claim 1, further comprising the 3D printer, wherein the at least one processor is configured to store instructions corresponding to the set of tool paths to at least one data store, which instructions are usable to drive the operation of the 3D printer to additively manufacture the part.

8. A method for adaptive domain reduction for thermo-structural simulation of an additive manufacturing process comprising:
through operation of at least one processor, carrying out a simulation of a part being additively produced according to a set of tool paths that correspond to instructions usable to drive a three dimensional (3D) printer to move a laser to additively produce the part, including:
determining an original mesh of the part that partitions the space of the part into a plurality of 3D elements;
determining an order of the elements of the original mesh to deposit in a plurality of successively deposited layers for additively producing the part based on the set of tool paths; and
simulating an incremental deposit of each of the elements of the original mesh for a material in the order that the elements are determined to be deposited, wherein for each incremental deposit of an additional respective element the at least one processor determines thermal characteristics and structural deformation characteristics of the deposited elements, wherein after the deposit of several layers have been simulated, subsequent simulation of elements in a current layer is carried out based on a respective modified version of the original mesh in which at least some of the layers of the original mesh previously simulated to be deposited under a current layer are retained and at least some of the layers of the original mesh previously simulated to be deposited under the retained layers are omitted.

9. The method according to claim 8, wherein simulating the incremental deposit of the elements in the current layer via a modified mesh in which at least some of the layers of the original mesh have been omitted, is carried out using a boundary condition for an interface between the retained and omitted layers based on the thickness of the omitted layers, a convection heat transfer coefficient, and thermal conductivity coefficient of the material.

10. The method according to claim 8, further comprising determining simulated layers to retain for the modified mesh by computing a thermal gradient associated with each of the simulated layers and selecting simulated layers to retain for the modified mesh that are associated with a thermal gradient larger than a predetermined threshold.

11. The method according to claim 8, wherein the original mesh corresponds to a hexahedral mesh comprised of the elements that are hexahedrons, further comprising through operation of the at least one processor:
determining element dimensions based on data corresponding to a laser width and a layer thickness for the 3D printer; and
receiving computer-aided design (CAD) data defining a 3D model of the part,
wherein the original mesh is determined based on the determined element dimensions and the 3D model of the part, wherein the order that the elements are deposited is determined based on a determination as to which elements of the original mesh intersect with a laser beam of the laser of the 3D printer as the 3D printer operates to deposit material onto the part based on the set of tool paths.

12. The method according to claim 8, wherein the determined thermal characteristics include data that specifies temperature changes of deposited elements, wherein the determined structural deformation characteristics include data that specifies structural changes of deposited elements determined based at least in part on the data that specifies temperature changes of the deposited elements, further comprising:
determining stress characteristics associated with all or a portion of the part based at least in part on at least one of the thermal characteristics, the structural deformation characteristics, or a combination thereof.

13. The method according to claim 8, further comprising through operation of the at least one processor:
causing a display device to output a visual animation that depicts each element being sequentially deposited to build up the part, wherein the animation includes at least a portion of the elements visually changing with each respective deposit of an element based on the thermal characteristics or the structural deformation characteristics determined for each respective deposit of an element.

14. The method according to claim 8, further comprising:
through operation of the at least one processor, generating instructions corresponding to the set of tool paths that are usable to drive the operation of the 3D printer to additively manufacture the part;
through operation of the 3D printer, producing the part using a configuration of the 3D printer based on the instructions corresponding the set of tool paths or the second set of tool paths.

15. A non-transitory computer readable medium encoded with executable instructions that when executed, cause at least one processor to:
carry out a simulation of a part being additively produced according to a set of tool paths that correspond to instructions usable to drive a three dimensional (3D) printer to move a laser to additively produce the part, including:
determining an original mesh of the part that partitions the space of the part into a plurality of 3D elements;
determining an order of the elements of the original mesh to deposit in a plurality of successively deposited layers for additively producing the part based on the set of tool paths; and
simulating an incremental deposit of each of the elements of the original mesh for a material in the order that the elements are determined to be deposited, wherein for each incremental deposit of an additional respective element the at least one processor determines thermal characteristics and structural deformation characteristics of the deposited elements, wherein after the deposit of several layers have been simulated, subsequent simulation of elements in a current layer is carried out based on a respective modified version of the original mesh in which at least some of the layers of the original mesh previously simulated to be deposited under a current layer are retained and at least some of the layers of the original mesh previously simulated to be deposited under the retained layers are omitted.

16. The non-transitory computer readable medium of claim 15, wherein the executable instructions, when executed, cause the at least one processor to simulate the incremental deposit of the elements in the current layer via a modified mesh, in which at least some of the layers of the original mesh have been omitted, using a boundary condition for an interface between the retained and omitted layers based on the thickness of the omitted layers, a convection heat transfer coefficient, and thermal conductivity coefficient of the material.

17. The non-transitory computer readable medium of claim 15, wherein the executable instructions, when executed, cause the at least one processor to determine simulated layers to retain for the modified mesh by computing a thermal gradient associated with each of the simulated layers and selecting simulated layers to retain for the modified mesh that are associated with a thermal gradient larger than a predetermined threshold.

18. The non-transitory computer readable medium of claim 15, wherein the original mesh corresponds to a hexahedral mesh comprised of the elements that are hexahedrons and wherein the executable instructions, when executed, cause the at least one processor to:
  determine element dimensions based on data corresponding to a laser width and a layer thickness for the 3D printer;
  receive computer-aided design (CAD) defining a 3D model of the part;
  determine the original mesh based on the determined element dimensions and the 3D model of the part; and
  determine the order that the elements are deposited based on a determination as to which elements of the original mesh intersect with a laser beam of the laser of the 3D printer as the 3D printer operates to deposit material onto the part based on the set of tool paths.

19. The non-transitory computer readable medium of claim 15, wherein the determined thermal characteristics include data that specifies temperature changes of deposited elements, wherein the determined structural deformation characteristics include data that specifies structural changes of deposited elements determined based at least in part on the data that specifies temperature changes of the deposited elements, and wherein the executable instructions, when executed, cause the at least one processor to:
  determine stress characteristics associated with all or a portion of the part based at least in part on at least one of the thermal characteristics, the structural deformation characteristics, or a combination thereof.

20. The non-transitory computer readable medium of claim 15, wherein the executable instructions, when executed, cause the at least one processor to:
  cause a display device to output a visual animation that depicts each element being sequentially deposited to build up the part, wherein the animation includes at least a portion of the elements visually changing with each respective deposit of an element based on the thermal characteristics or the structural deformation characteristics determined for each respective deposit of an element.

* * * * *